Figure 1:
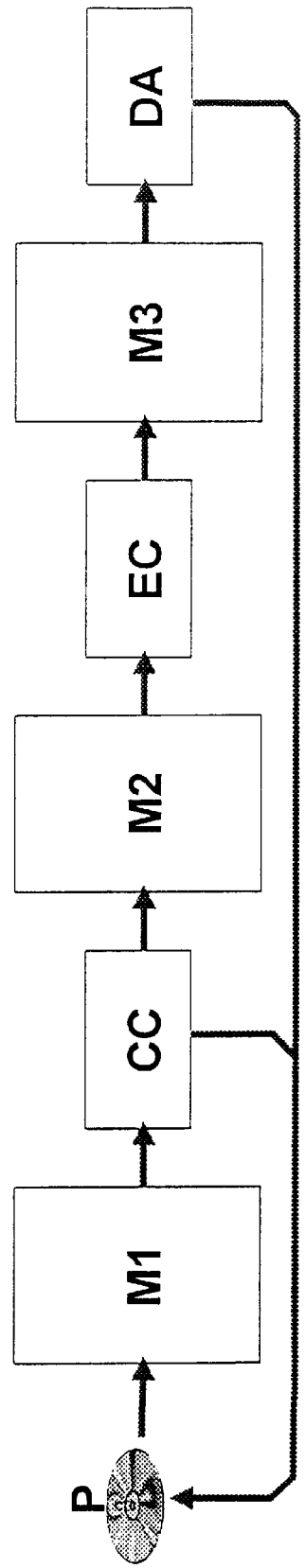

United States Patent [19]
Hütter

[11] Patent Number: 6,160,785
[45] Date of Patent: Dec. 12, 2000

[54] METHOD AND APPARATUS FOR THE PROCESSING AND OUTPUTTING OF DATA

[75] Inventor: Ingo Hütter, Celle, Germany

[73] Assignee: Deutsche Thomson-Brandt GmbH, Villingen-Schwenningen, Germany

[21] Appl. No.: 09/034,694

[22] Filed: Mar. 4, 1998

[30] Foreign Application Priority Data

Mar. 12, 1997 [DE] Germany .......................... 197 10 022

[51] Int. Cl.⁷ ...................................................... G11B 7/00
[52] U.S. Cl. ........................................ 369/124.09; 369/54
[58] Field of Search ................................ 369/54, 58, 47, 369/48, 124, 94, 60, 124.09; 367/59

[56] References Cited

U.S. PATENT DOCUMENTS

| 4,796,247 | 1/1989 | Vogelsang | ................................ 369/33 |
| 5,822,288 | 10/1998 | Shinada | ..................................... 369/60 |

FOREIGN PATENT DOCUMENTS 0707315  4/1996  European Pat. Off. .
4103973  8/1992  Germany .
4319278  4/1997  Germany .

*Primary Examiner*—Thang V. Tran
*Attorney, Agent, or Firm*—Joseph S. Tripoli; Eric P. Herrmann

[57] ABSTRACT

In a further development of the CD, the so-called DVD, a data format was chosen which is upwards compatible with the CD. As a result, existing audio CDs can also be played on a DVD player. If complete error correction is not possible during the reproduction of a CD by an audio CD player, then simple measures for error concealment are additionally taken, but they are not always adequate. However, for cost reasons more complicated methods are not used in an audio CD player, since they would require a more powerful processor and a larger memory. However, a DVD player has this more complex hardware in any event, in order to enable the outstanding video quality that is intended. According to the invention, therefore, during the reproduction of an audio CD on a DVD player, one of various error concealment methods is carried out in dependence on the error rate that occurs, with a low error rate it being possible to effect error concealment that is considerably more accurate in comparison with a conventional CD player.

7 Claims, 1 Drawing Sheet

METHOD AND APPARATUS FOR THE PROCESSING AND OUTPUTTING OF DATA

The invention relates to a method and an apparatus for the processing and outputting of data which are stored on a data medium, in particular a method and an apparatus for error concealment during the reproduction of audio CDs.

BACKGROUND

At present, a further development of the CD, the so-called DVD ("Digital Video Disc" or "Digital Versatile Disc"), is about to be introduced on the market. The DVD is likewise an optical data medium having the same dimensions as those of the CD, but a considerably higher data storage capacity than the CD. The players for DVDs will in some instances also enable the playing of existing audio CDs.

During the reproduction of a compact disc (CD) by an audio CD player, the EFM (eight-to-fourteen modulation) signal is obtained from the optically scanned signal after pulse shaping. After EFM demodulation, the signal obtained in this way is firstly fed to an error correction circuit prior to outputting by a digital-to-analogue converter. In the error correction circuit, coding of the data at the recording end in accordance with the cross-interleave Reed-Solomon method is reversed. For this purpose, the signal is read into a memory and is read out again in the de-interleaved order. If complete error correction is not possible, then measures for error concealment are additionally taken in order to reduce the audibility of these errors. These error concealment methods implemented in an audio CD player are simple and not always adequate. However, more complicated methods are not used for cost reasons, since they would require a more powerful processor and a larger memory. If the data loss is very great, only the muting of the signal therefore remains in the extreme case.

INVENTION

The invention is based on the object of specifying a method for improved error concealment during the reproduction of data, the data being read from a data medium, in particular from a CD or a DVD.

Compared with a conventional CD player, a DVD player has a considerably more powerful processor and a significantly larger buffer memory. This more complex hardware is necessary in order to enable the outstanding video quality that is intended. When a CD is played by a DVD player, therefore, the audio data that are read can be buffer-stored in the buffer memory, and processed, to a greater extent in order e.g. to perform error concealment. This error concealment can be carried out considerably more accurately than with a conventional CD player, since more complex algorithms can be processed by the more powerful processor. This does presuppose, however, that high-quality CDs are used and the DVD player is installed at an undisturbed location. By contrast, poor-quality CDs require error concealment to be carried out more frequently, with the result that it is then no longer possible to use a complex error concealment method. Likewise, in the event of frequent vibrations and/or with portable devices, the pick-up is often required to effect a return, with the result that it is likewise not possible to carry out complex error concealment in this case.

In principle, the inventive method for the processing and outputting of data which are read from a data medium and buffer-stored consists in selecting one of various processing methods in dependence on the number of buffer-stored data.

In this case, the number of buffer-stored data may depend in particular on the error rate of these data.

In this case, the data are preferably read from the data medium at a first rate and, following buffer-storage and processing, are output at a second rate.

In an advantageous manner, error concealment methods of different complexity are carried out in the various processing methods, which error concealment methods serve to reduce data errors which could not be eliminated earlier on by error correction.

In a particularly advantageous manner, the method can be employed when the data are optically read from the data medium, the data being audio signals.

In principle, the inventive apparatus for the processing and outputting of data which are read from a data medium comprises means for reading data media, one or more memories for buffer-storing the data, and also means for processing the data and means for switching between various processing methods in dependence on the occupancy of the memory or of the memories.

It is advantageous here if the means for processing the data can carry out error concealment methods of different complexity for the purpose of reducing data errors.

The means for reading data media are preferably suitable for data media having different data formats.

In this case, an expedient refinement of the concept of the invention envisages that the apparatus is suitable for the reproduction of audio CDs and DVDs, and is part of a DVD player or of a DVD-ROM drive, which may in turn be configured as a separate device or be integrated in another device.

DRAWING

An exemplary embodiment of the invention is described with reference to FIG. 1. The latter shows a block diagram of a DVD player according to the invention.

EXEMPLARY EMBODIMENTS

FIG. 1 illustrates a DVD device according to the invention. First of all the information stored on the CD disk is read by an optical scanning system which is part of the pick-up P. The optical scanning system is in this case able to read both CD disks and DVD disks. The signal obtained is then subjected to pulse shaping and EFM demodulation, after which it is fed to an error correction circuit. This part of the signal recovery is also still part of the entire pick-up P. The data are then read into a first buffer memory M1, this being carried out at a higher rate than in the case of a conventional CD player, e.g. at a doubled rate. A continuity check CC then follows, in which the continuity in the data stream is checked. If there is no continuity in the data stream or the buffer memory M1 is filled by the high reading rate, a return in the pick-up is compelled. This is then followed, after further buffer-storage in the buffer memory M2, by the actual error concealment EC. Afterwards, the data are then output via a D/A converter DA. The quality and hence the complexity of the error concealment chosen is in this case chosen in dependence on the occupancy of the buffer memory M3 and/or of the error rate that occurs. If this memory is well filled, it is possible to use error concealment strategies that require more time, in particular more extensive interpolation algorithms.

The three buffer memories M1, M2 and M3 may be arranged in the same RAM, in which case only the size of the three buffer memories changes dynamically. The data are stored in data sectors, in which case a data sector is released for renewed writing when the content of this data sector has been output by the D/A converter DA, or a data sector is released by the continuity check CC. The arrows in FIG. 1 symbolize the transport path for the data sectors. In this case, the data are not actually forwarded between the processes, rather only pointers to the data are altered.

Since the processor of a DVD player is not utilized to capacity during the reproduction of an audio CD, all the data blocks will normally accumulate upstream of the output process, since its speed does not depend on the processor power but on the output data rate.

The excess processor power can therefore be utilized for error concealment, without additional hardware being necessary and thus higher costs being entailed. In this case, erroneous samples can be concealed e.g. by complex interpolation using previous and succeeding error-free samples. If the queue between error concealment EC and the actual output process DA is very long, it is possible to perform a good and correspondingly time-consuming error concealment. If the queue has then shrunk to below a specific length, however, a switch is made back to a simpler concealment. Consequently, given the use of high-quality CDs and an undisturbed location where the CD player is installed—and thus only very seldom occurring non-correctable errors—it is always possible to use the best method for error concealment and thus achieve a better reproduction quality than with a conventional CD player. If, on the other hand, the CD is of a very poor quality or difficult reproduction conditions prevail, then error concealment would have to be carried out very frequently. In this case, it would then no longer be possible to employ a very complex method for error concealment, rather a simpler error concealment method ensuring at least a minimum quality would be used.

It is also possible to utilize the excess processor power and/or the memory of a further, external device for the method according to the invention. The external device may in this case be e.g. a television set or a set-top box. However, it is equally possible to connect the CD or DVD player to a computer or integrate it therein.

The invention can be utilized for the reproduction of digital audio signals. These will be signals in the PCM format, in particular. In the PCM method, at intervals defined by the sampling rate, the respectively current value of the audio curve is determined and stored in numerical form, a specific number of bits (usually between 8 and 24) being combined each time. It is possible to effect reproduction both of audio CDs by a CD player or DVD player and of DVDs with PCM audio data on a DVD player. An application for the audio reproduction of minidisks is also conceivable.

However, the invention is in no way restricted to the read-out, processing and reproduction of audio signals. Rather it is equally possible to process and/or correct data errors in video data or other data. Therefore, an application in the reproduction of Video-CDs, Photo-CDs, CD-ROMs, personally recorded CD-Rs or other optically readable data media on a DVD player or other future further developments is also conceivable.

What is claimed is:

1. Method for processing and outputting data which are read from a data medium and then buffer-stored, including providing error concealment modes of different complexity in various processing methods, the error concealment modes serving to reduce data errors which could not be eliminated earlier on by error correction and the concealment processing method is selected in dependence on the volume of buffer-stored data.

2. Method according to claim 1, wherein the volume of buffer-stored data depends on an error rate of said data.

3. Method according to claim 1 wherein the data are read from the data medium at a first rate and, following buffer-storage and processing, are output at a second rate.

4. Method according to claim 1, wherein the data are read optically from the data medium, and the data represent audio signals.

5. Apparatus for processing and outputting data, comprising:

circuitry for reading a data medium;

one or more memories for buffer-storing data read from the medium;

multimode error concealment circuitry coupled to said memories and capable of being switched between interpolative error concealment modes of different complexity; and control circuitry responsive to data occupancy of said memories for controlling switching between concealment modes.

6. Apparatus according to claim 5, wherein the circuitry for reading data media are suitable for data media having different data formats.

7. Apparatus according to claim 6, wherein the circuitry for reading data media enable reproduction of audio CDs and DVDs, and are part of a DVD player or of a DVD-ROM drive, wherein the DVD player or the DVD-ROM drive may be a separate device or integrated in another device.

* * * * *